United States Patent Office 2,819,313
Patented Jan. 7, 1958

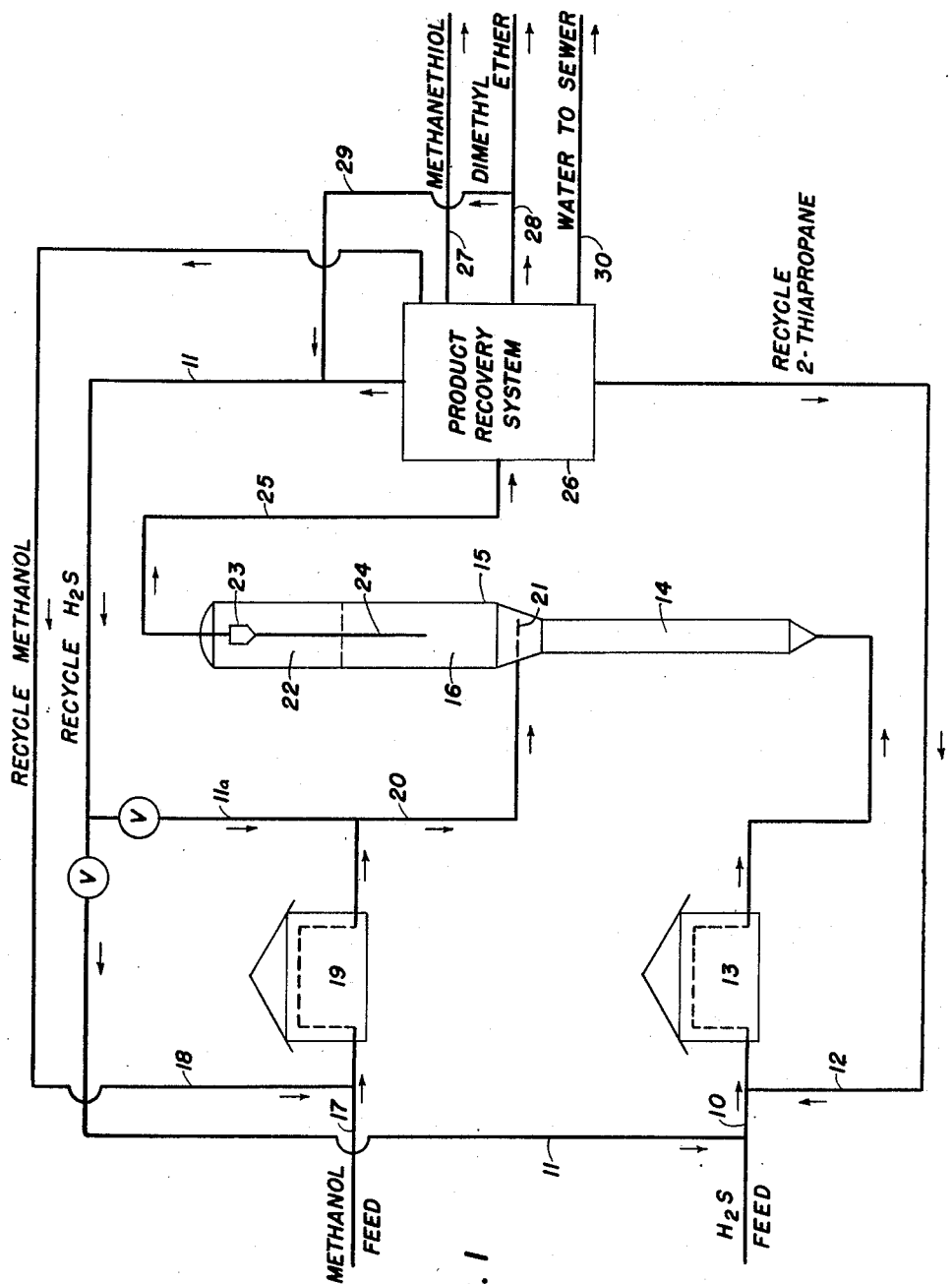

2,819,313

METHYL MERCAPTAN MANUFACTURE FROM METHANOL AND HYDROGEN SULFIDE

Harvey Hennig, Cary, Ill., assignor to Pure Oil Company, Chicago, Ill., a corporation of Ohio Application December 14, 1953, Serial No. 397,860

6 Claims. (Cl. 260—609)

This invention relates to the preparation of methanethiol and is more specifically concerned with an integrated process for the manufacture of methanethiol by reacting separate amounts of hydrogen sulfide with separate proportions of methanol and 2-thiapropane, respectively.

Numerous methods for the production of mercaptans employing a plurality of different reactants and different reaction mechanisms are described in the prior art. In spite of this variety, there has only been one process which has any commercial significance, namely, the reaction between olefins and hydrogen sulfide carried out in the presence of a suitable catalyst such as silica-alumina, Friedel-Crafts catalyst and the like. While this process produces excellent results when employed in the production of high molecular weight mercaptans, it cannot be used to produce in commercial quantities the lowest molecular weight member of the homologous mercaptan series, namely, methanethiol. Heretofore there was no considerable demand for methanethiol because only limited amounts were necessary to supply the demand for its use as an odorant to be added to odorless gases, such as natural gas, in order to facilitate the detection of leaks or as an intermediate in chemical reactions. With the discovery that methionine, an amino acid having the formula

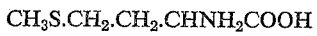

$CH_3S.CH_2.CH_2.CHNH_2COOH$ was important in animal nutrition and could overcome dietary deficiencies when used as a supplement in poultry feed, development work on the production of commercial amounts of methanethiol was accelerated because of the importance of methanethiol as an intermediate in the production of methionine. Of the several processes available for the preparation of methanethiol, the petroleum industry as producers of this compound would be most interested in the one involving the reaction between methanol and hydrogen sulfide because of the availability of the reactants from within the industry itself or its allied industries. Hydrogen sulfide is available in the tail gas of numerous petroleum refining processes and can be readily purified to remove small amounts of contaminants, such as $CO_2$ and light hydrocarbons by conventional gas purification processes. Methanol can be obtained as a product of the methanol synthesis process, wherein a synthesis gas consisting essentially of hydrogen and carbon monoxide, obtainable by the oxidation of natural gas, is contacted with a suitable catalyst to form methanol and minor amounts of other oxygenated organic compounds. Thus the use of this basic reaction for producing methanethiol permits it to be economically produced, inasmuch as the reactants may be readily obtained and unusual operating conditions of temperature and pressure and the like which would require special processing equipment are not necessary.

In previous preparations of methanethiol by the interaction between methanol and hydrogen sulfide, thoria was employed as a catalyst. Because of the high cost of thoria, its density, tendency to pack, heat sensitivity and low mechanical strength, considerable effort has been expended in investigating other catalysts which would not have the inherent defects of thoria and which could be more effectively used in promoting the reaction. As a result, a number of satisfactory catalysts have been discovered which possess the required physical characteristics. Some of these, however, while possessing the physical desiderata are deficient from a chemical standpoint because of poor selectivity. In other words, these catalysts not only increase the efficiency of the primary reaction, but also effect the production of substantial amounts of side products. The side reactions which produce these secondary products result in the production of considerable quantities of 2-thiapropane, some dimethyl ether, as well as insignificant amounts of formaldehyde. These side products, of course, seriously affect the yield of methanethiol as determined by the amount of methanol which is used in the process.

It is therefore an object of this invention to increase the ultimate yield of methanethiol produced in the reaction between methanol and hydrogen sulfide by converting the 2-thiapropane produced as a by-product into methanethiol.

One advantageous system utilizing the principle of this invention is illustrated schematically in Figure 1 of the attached drawing.

According to the process of the invention the ultimate yield of mercaptan may be produced by reacting in a primary zone hydrogen sulfide and methanol in the presence of a suitable catalyst under suitable reaction conditions to produce a reaction effluent which contains, in addition to the methanethiol, substantial amounts of 2-thiapropane. The effluent is processed in a recovery system to recover separate streams of methanethiol and 2-thiapropane. The latter by-product of the reaction is recycled to a secondary reaction zone wherein it is interacted with additional amounts of hydrogen sulfide and in the presence of the same catalyst employed in the primary reaction zone and converted into methanethiol. In the process of this invention, a special reactor is used whereby the over-all selectivity of the process is improved by the design and operation of the reactor rather than any change in catalyst. By-product 2-thiapropane and hydrogen sulfide are processed in the bottom section of the reactor to form methanethiol. In carrying out this secondary reaction an excess of hydrogen sulfide is employed. The unreacted hydrogen sulfide is transferred to the upper section of the reactor where it is contacted with methanol in the presence of the same catalyst employed in the bottom section to form additional amounts of methanethiol. The invention is best understood by referring to the attached drawing. Fresh hydrogen sulfide gas from a suitable source such as a gas-purification absorption process employing an aliphatic amine solution conventionally employed in a petroleum refinery is introduced into the system through line 10. This gaseous stream may be joined by a recycle hydrogen sulfide stream, if desired, recirculated by means of line 11. A recycle 2-thiapropane stream obtained as hereinafter described passes through line 12 and joins the hydrogen sulfide stream. The reaction mixture is introduced into heater 13 where the reactants are raised to a suitable reaction temperature. The heated reactants are transferred to the lower reaction zone 14 of reactor 15. The reactants, hydrogen sulfide and 2-thiapropane, contact a suitable catalyst such as activated alumina, silica-alumina combinations, in this lower reaction zone 14. The catalyst is maintained in a fluidized state by the reactants passing up through the catalyst. In this zone 14, the hydrogen sulfide and 2-thiapropane interact to form amounts of methanethiol. The reaction effluent from the zone containing methanethiol, 2-thiapropane, and hydrogen sulfide passes to a second reaction zone where it is admitted with methanol. Methanol which may be obtained from any suitable source enters the system through line 17. This stream joins at a point of confluence with a recycle methanol stream which is returned to the process section of the system through line 18. The methanol feed is heated in heater 19 and introduced into the upper reaction zone 16 and distributor 21 through line 20. It may be desirable in some instances to introduce hydrogen sulfide into the reactor concomitantly with the methanol. If so, line 11a is provided to effectuate this objective. The feed introduced through distributor 21 and the unreacted hydrogen sulfide in the reaction effluent rising from the lower reaction zone 14 commingle and interact in the upper reaction zone 16 in the presence of the fluidized bed of catalyst to form methanethiol, 2-thiapropane, water, a small amount of dimethyl ether, and possible trace amounts of other by-products.

It is to be noted that although separate reaction zones are referred to, these zones are contained in a single reactor. Furthermore only one bed of catalyst need be employed so that in effect these separate zones are parts of the dense phase of the fluidized bed of catalyst. It may be desirable to construct the upper reaction zone 16 of reactor 15 with a larger diameter than that of the lower zone 14 in order to insure good fluidization of the catalyst since additional vapors are introduced into the upper zone 16. Reactor 15 being a conventional reactor for use in fluidized catalytic processes contains a catalyst disengaging space 22, and means for separating catalyst from the vapor such as a cyclone separator 23 with dip leg 24. The products of the reactions carried out in the lower and upper reaction zones 14 and 16 pass through line 25 to a suitable product recovery system 26. The product recovery system which is shown only schematically in Figure 1 may be any desired system which will provide for the separation of the desired products. As an illustrative example, a system employing the principles of fractional condensation and stabilization may be employed. However, it is within the scope of the instant invention to employ alternative process recovery techniques, for example those in which the principles of absorption are utilized. Suitable recovery systems employing both principles are further described in a copending patent application, Serial Number 260,353, filed by Richmond T. Bell on December 7, 1951. Other types of recovery systems may also be used, it only being necessary for carrying out the instant invention that an efficient recovery system for separating methanethiol and 2-thiapropane from the reaction effluents be employed. From the product recovery or separating system, methanethiol is sent to storage through line 27. By-product dimethyl ether, if recovered as a separate product, may go to storage through line 28 and/or may be returned to the processing section of the system through line 29 to a point of confluence with the recycle hydrogen sulfide stream 11. If it is desired that the dimethyl ether be recycled for further processing, it is preferred that it be admixed with the hydrogen sulfide recycle stream and returned to the lower reaction zone 14 of reactor 15 for conversion to methanethiol concomitantly with the 2-thiapropane since this zone is relatively free of methanol. Water formed in the reaction zone of reactor 15 is separated in the recovery section 26 and disposed of through line 30.

To show some of the advantages obtainable by conducting the methanethiol synthesis as disclosed herein in comparison to synthesis in a single-pass reactor, which heretofore has been the conventional manner of carrying out the reaction between methanol and hydrogen sulfide to produce methanethiol, the following examples are tabulated. Case A represents processing by the method of this invention, while case B represents processing by conventional procedures. In each case activated alumina, a catalyst having a high reactivity but low selectivity under the process conditions utilized in the illustrative example is employed to promote the reactions.

I. Process conditions

| | Case A | | | Case B |
|---|---|---|---|---|
| | Upper Section | Lower Section | Total | |
| Reactor Dia., ft. | 1.7 | 1.46 | | 1.85 |
| Cat. Bed Depth, ft. (30% expansion) | 10.1 | 19.0 | 29.1 | 13.0 |
| Cat. Vol., cu. ft. (settled) | 17.6 | 24.4 | 42.0 | 27.0 |
| Temp., °F. | 750 | 1,100 | | 750 |
| Press., p. s. i. g. | 150 | 150 | 150 | 150 |
| Space Velocity: Liquid hourly vol. based on | 0.4 (CH₃OH) | 0.25 (CH₃)₂S | | 0.4 (CH₃OH) |
| Feed, lb./hr. | 387 | 943 | 1,330 | 1,225 |
| Feed ratio, mols: | | | | |
| H₂S/(CH₃OH) | 1 | | 1 | 1 |
| H₂S/(CH₃)₂S | | 3.5 | | |
| Feed, fresh: | | | | |
| CH₃OH, gal./hr. | 52.8 | | 52.8 | 80.6 |
| H₂S, lb./hr. | | 341 | 341 | 432 |
| Recycle, lb./hr.: | | | | |
| H₂S | | 279 | 279 | 199 |
| (CH₃)OH | 38 | | 38 | 59 |
| (CH₃)₂S | | 323 | 323 | |

II. Process results

| | Case A | Case B |
|---|---|---|
| Products, lb./hr.: | | |
| CH₃SH | 480 | 480 |
| (CH₃)₂S | | 166 |
| (CH₃)₂O | 19 | 31 |
| H₂O | 189 | 288 |
| Conversion, mol. percent, per pass: | | |
| CH₃OH | 90 | 90 |
| (CH₃)₂S | 33 | |
| Selectivity,[1] over-all | 92 | 60 |

[1] Mols CH₃SH formed/CH₃OH reacted.

The foregoing illustrative but non-limiting example demonstrates the efficiency and economy of the apparatus and process of this invention whereby substantial savings in raw materials are achieved with only a moderate increase in process equipment size. In carrying out the primary reaction between methanol and hydrogen sulfide, a range of operating conditions may be employed. The reaction temperature may be from about 650° F. to 850° F. and although operation at a superatmospheric pressure from about 20 p. s. i. g. to 150 p. s. i. g. is preferred, the process may be operated at lower pressures including atmospheric and subatmospheric pressures. The space velocity, LHSV, which is defined as the liquid volume at 60° F. of the limiting reactant fed per hour per unit volume of settled catalyst contained in the effective reactor or catalyst bed may be from about 0.25 to 5.0 v./hr./v. In the upper reaction zone, the limiting reactant which is used to determine space velocity is methanol. The mol ratio of the reactants may range from about 1 to about 5 mols of hydrogen sulfide to 1 mol of methanol. Although it is generally preferred to maintain an excess of hydrogen sulfide in the reactant mixture, it may be desirable to employ stoichiometric proportions in order to avoid unnecessary complications that may occur, for example, in the recovery system. Catalysts which may be used for promoting the reaction between methanol and hydrogen sulfide to produce methanethiol in the first reaction zone include activated alumina, which is the preferred catalyst, silica-alumina, bauxite or montmorillonite type clays.

Similarly in the lower reaction zone employed in the process of this invention a variety of operating conditions may be employed. For example, a temperature range of about 700–1200 and preferably 900–1150° F.; pressures from about 0 to 150 p. s. i. g., with a range of about 20 to 150 p. s. i. g. being preferred; a space velocity range, as defined above, of about 0.1 to 10, preferably 0.2 to 2, and a molar ratio of hydrogen sulfide to 2-thiapropane of about 1:1 to 10:1, and preferably about 2:1 to 5:1, are typical of the variations in operating conditions that may be employed in the lower reaction zone. In the instant invention the catalyst employed in the lower reaction zone is the same as that employed in the first reaction zone hereinbefore described.

From the foregoing discussion, it is evident that by employing the instant invention, it is possible to obtain a much higher yield of methanethiol from methanol and $H_2S$ by minimizing the production of the principal by-products 2-thiapropane, and dimethyl ether. A single catalyst is employed, and only a single reactor is required. With the process in operation, the large excess of $H_2S$ and the absence of methanol in the lower reaction zone of the reactor permit the conversion of the by-products which form over the same catalyst in the upper reaction zone where methanol is present and $H_2S$ is not present in as great an amount relative to the other reactants as in the lower reaction zone. Although the process is preferably conducted employing the fluidized solids technique, the principles thereof also may be applied with fixed or moving beds of catalysts.

Having described my invention, I now claim:

1. A process for producing methanethiol which comprises reacting methanol and hydrogen sulfide in a primary reaction zone at a temperature of about 650° to 850° F., a pressure of about atmospheric to 150 p. s. i. employing a liquid volume hourly space velocity, based on methanol, of about 0.25–5 and a mol ratio of reactants of 1–5 mols of hydrogen sulfide to 1 mol of methanol in the presence of a catalyst consisting essentially of activated alumina and to produce a reaction effluent consisting essentially of methanethiol, 2-thiapropane, water, dimethyl ether, and unreacted hydrogen sulfide and methanol, recovering from the said reaction effluent a methanethiol fraction and a 2-thiapropane fraction, passing the 2-thiapropane fraction to a secondary reaction zone, reacting the 2-thiapropane fraction with amounts of hydrogen sulfide substantially in excess of the stoichiometric amounts required for said reaction in the absence of methanol at a temperature of about 700° to 1200° F., at a pressure of about atmospheric to 150 p. s. i. employing a liquid volume hourly space velocity, based on 2-thiapropane, of about 0.1–10, and a mol ratio of reactants of 3–10 mols of hydrogen sulfide per mol of 2-thiapropane in the presence of a catalyst consisting essentially of activated alumina to produce additional quantities of methanethiol, the catalyst employed in the secondary reaction zone having the same composition as that employed in the primary reaction zone, and transferring said reaction effluent directly to said primary reaction zone.

2. A process for producing methanethiol which comprises reacting methanol and hydrogen sulfide in a primary reaction zone at a temperature of about 650° to 850° F., employing a liquid volume hourly space velocity, based on methanol, of about 0.25–5 and a mol ratio of reactants of 1–5 mols of hydrogen sulfide to 1 mol of methanol in the presence of a catalyst consisting essentially of activated alumina to produce a reaction product containing reaction products consisting essentially of methanethiol, 2-thiapropane, water, dimethyl ether, and unreacted hydrogen sulfide and methanol, fractionating said reaction effluent to separate a 2-thiapropane fraction, passing the 2-thiapropane fraction to a secondary reaction zone, reacting the 2-thiapropane fraction with amounts of hydrogen sulfide substantially in excess of the stoichiometric amounts required for said reacting in the absence of methanol at a temperature of about 700°–1150° F., at a pressure of about 20–150 p. s. i. employing a liquid volume hourly space velocity, based on 2-thiapropane, of about 0.1–10, and a mol ratio of reactants of 3–10 mols of hydrogen sulfide per mol of 2-thiapropane in the presence of a catalyst consisting essentially of activated alumina catalyst to produce a reaction effluent containing additional quantities of methanethiol, and passing said reaction effluent directly to said primary reaction zone, said primary and secondary reaction zones constituting the upper and lower reaction zones, respectively of a unitary reactor.

3. A process for producing methanethiol which comprises reacting methanol and hydrogen sulfide in a primary reaction zone at a temperature of about 650° to 850° F., employing a liquid volume hourly space velocity, based on methanol, of about 0.25–5 and a mol ratio of reactants of 1–5 mols of hydrogen sulfide to 1 mol of methanol in the presence of a catalyst consisting essentially of a fluidized activated alumina to produce a reaction product containing reaction products consisting essentially of methanethiol, 2-thiapropane, water, dimethyl ether, and unreacted hydrogen sulfide and methanol, fractionating said reaction effluent to separate a 2-thiapropane fraction, passing the 2-thiapropane fraction to a secondary reaction zone, reacting the 2-thiapropane fraction with amounts of hydrogen sulfide substantially in excess of the stoichiometric amounts required for said reacting in the absence of methanol at a temperature of about 700°–1150° F., at a pressure of about 20–150 p. s. i. employing a liquid volume hourly space velocity, based on 2-thiapropane, of about 0.1–10, and a mol ratio of reactants of 3–10 mols of hydrogen sulfide per mol of 2-thiapropane in the presence of a catalyst consisting essentially of a fluidized activated alumina catalyst to produce a reaction effluent containing additional quantities of methanethiol, and passing said reaction effluent directly to said primary reaction zone, said primary and secondary reaction zones constituting the upper and lower reaction zones, respectively of a unitary dense phase of a fluidized catalyst system, said upper zone having a larger diameter than said lower zone whereby effective fluidization of the activated alumina catalyst in the upper zone is effected.

4. A process in accordance with claim 2 in which sufficient amounts of hydrogen sulfide are introduced into the secondary reaction zone to provide in the reaction effluent from said secondary reaction zone at least stoichiometric amounts of hydrogen sulfide whereby the reacting of the methanol and hydrogen sulfide in the primary reaction zone is carried out in the absence of added amounts of hydrogen sulfide.

5. A process in accordance with claim 4 in which a mol ratio of reactants of not less than 3 mols of hydrogen sulfide per mol of 2-thiapropane is employed in the secondary reaction zone.

6. A process for producing methanethiol which comprises reacting substantially stoichiometric amounts of methanol and hydrogen sulfide in a primary reaction zone at a temperature of about 750° F., and a pressure of about 150 p. s. i. employing a liquid volume hourly space velocity, based on methanol, of about 0.4 in the presence of a fluidized catalyst consisting essentially of activated alumina to produce a reaction effluent consisting essentially of methanethiol, 2-thiapropane, water, dimethyl ether, and unreacted hydrogen sulfide and methanol, fractionating said reaction effluent to separate a 2-thiapropane fraction, passing the 2-thiapropane fraction to a secondary reaction zone, reacting the 2-thiapropane fraction with hydrogen sulfide in the mol ratio of 3.5 mols of 2-thiapropane per mol of hydrogen sulfide, at a temperature of 1100° F. and a pressure of 150 p. s. i. employing a liquid volume hourly space velocity of 0.25, based on 2-thiapropane, to produce a reaction effluent containing additional quantities of methanethiol, and passing said reaction effluent directly to said primary reaction zone, said primary and secondary reaction zones constituting the upper and lower reaction zones, respectively of a unitary dense phase of a fluidized catalyst system said upper zone having a larger diameter than said lower zone whereby effective fluidization of the activated alumina catalyst in the upper zone is effected.

(References on following page)

References Cited in the file of this patent

UNITED STATES PATENTS

| | | |
|---|---|---|
| 2,116,182 | Baur | May 3, 1938 |
| 2,514,300 | Laughlin | July 4, 1950 |
| 2,565,195 | Bell | Aug. 21, 1951 |
| 2,647,151 | Bell | July 28, 1953 |
| 2,667,515 | Beach et al. | Jan. 26, 1954 |
| 2,685,605 | Bell | Aug. 3, 1954 |

OTHER REFERENCES

Schulze et al.: Ind. and Eng. Chem., vol. 40, No. 12, pages 2308–11, December 1948.